Feb. 10, 1925.

R. R. BLOSS 1,525,635

SELF OILING BEARING

Filed Oct. 10, 1922

Richard R. Bloss
INVENTOR.

BY

Edwin P. Corbett
ATTORNEY.

Patented Feb. 10, 1925.

1,525,635

UNITED STATES PATENT OFFICE.

RICHARD R. BLOSS, OF COLUMBUS, OHIO, ASSIGNOR TO THE INTERNATIONAL DERRICK & EQUIPMENT COMPANY, OF COLUMBUS, OHIO, A CORPORATION OF OHIO.

SELF-OILING BEARING.

Application filed October 10, 1922. Serial No. 593,622.

*To all whom it may concern:*

Be it known that RICHARD R. BLOSS, a citizen of the United States of America, residing at Columbus, in the county of Franklin and State of Ohio, has invented certain new and useful Improvements in Self-Oiling Bearings, of which the following is a specification.

My invention relates to self-oiling bearings and has to do with the provision of a novel oiling device which will automatically keep the shaft lubricated so long as a supply of oil remains in the reservoir which forms a part thereof.

My invention has to do primarily with the provision of a bearing holding a quantity of lubricant which will be automatically supplied to the shaft while operating and will be discontinued upon cessation of rotation of the said shaft. This is accomplished through utilizing capillary attraction in the feeding of oil from reservoirs, provided in the bearing caps, through wicks to the shaft.

One of the objects of my invention is the provision of a simple means of lubricating bearings which requires a minimum of attention and yet will provide sufficient oil at all times.

Another object of my invention has to do with economy in the use of lubricant which results from the fact that, when the journal stops revolving, the oil is not carried away from the wick because it is so saturated with oil that capillary attraction within said wick ceases to raise a further supply from the reservoirs. However, as soon as the journal begins traveling, carrying oil from the wick, capillary attraction again draws oil from the reservoirs and over to the journal.

Various other features of my invention will be apparent as this description progresses and will be brought out in the claims appended hereto. The various objects of my invention are preferably obtained by the structure illustrated in the drawings, wherein similar characters of reference designate corresponding parts and wherein—

Figure 1:
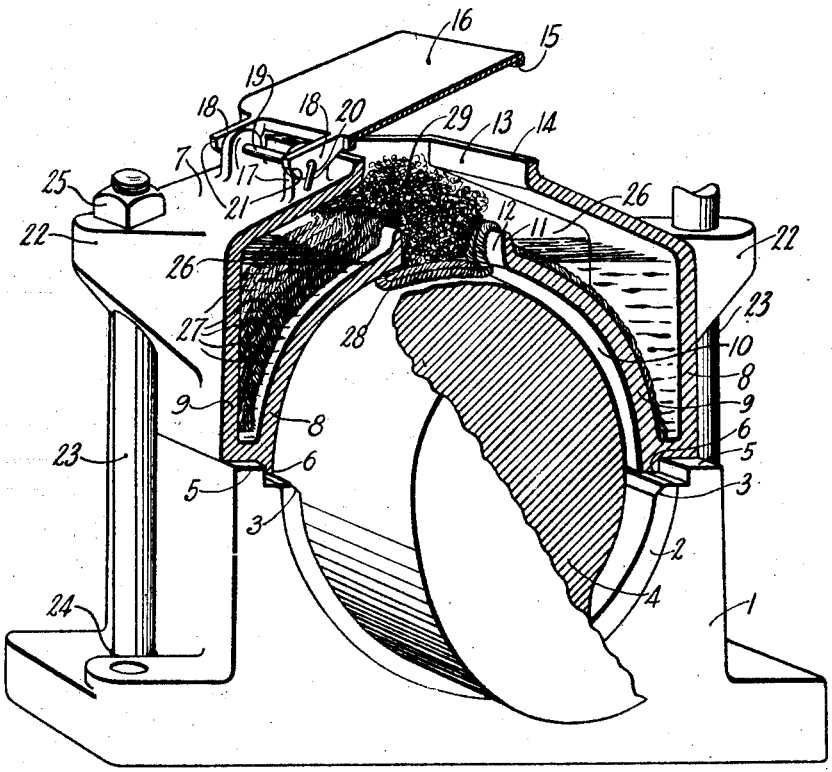
Figure 1 is a perspective view, partially in section, of my self-oiling bearing.

In the drawings, my invention is shown as comprising a bearing base 1, lined as at 2, and having the edges of said lining beveled as at 3 to aid in keeping a supply of oil against the shaft 4 and assist in its lubrication. The bearing base 1 is provided with upstanding ledges 5 paralleling the journal 4, which coact with depending ledges 6 of the bearing cap 7 holding it in parallel relation to the said journal 4. The journal 4 requires a bearing only on its lower side, since all of the forces are in a downward direction.

The bearing cap 7 is provided with an outer wall 8 and inner walls 9 concentric with the journal 4 and spaced an appreciable distance therefrom as at 10, the upper edges of which are flanged as at 11. Between the upstanding flanges 11 is provided a rectangular opening 12 exposing the journal 4. The upper part of the outer wall 8 is provided with a rectangular opening 13 surrounded by an upstanding flange 14. This flange is designed to extend within the downwardly depending flange 15 of the lid 16, when closed, to assist in excluding water and other foreign substances from the bearing.

The lid 16 is hinged to the upstanding lugs 17 of the bearing cap 7 by the hinge member 18 and the rod 19, passing through holes in said lugs 17 and hinge members 18 and having both ends bent over as at 20 to prevent it from working out. The hinge members 18 are so designed that the portion 21 thereof, coacting with the bearing caps 7, forms a positive stop, preventing the lid 16 from being raised beyond such a position that it will be closed by gravity when released.

The bearing cap is further provided with horizontally extending lugs 22 through which pass bolts 23, the heads of which are set into the bearing base 1 as at 24 and having nuts 25 for holding said bearing caps 7 firmly but removably connected to the bearing base 1. It will be seen that while the inner wall 9 of the bearing cap 7 does not fit the journal 4 closely, it will not allow said journal 4 to jump out of the bearing base 1.

From the drawing, it will be obvious that the inner walls 9, joining the outer wall 8, at their ends as well as at the bottom, form reservoirs for a supply of lubricating oil. These reservoirs 26 are of comparatively large capacity without making the bearing caps 7 bulky or cumbersome, owing to the fact that the inner wall conforms to the contour of the journal.

Within the reservoirs 26, which are filled with oil almost to the top of the flanges 11, are placed one or more wicks extending from the bottoms of the reservoirs 26, over the flanges 11, looped down within the opening 12 and contacting with the journal as at 28 where they are held by a quantity of waste 29 which holds a reserve supply of oil immediately available to the portions of the wicks within the opening 12, as well as preventing dust and other foreign substances from gaining access to the bearing.

The wicks 27 take up oil from the reservoirs 26 by capillary attraction and carry it over the flanges 11 and downwardly onto the revolving journal 4 which carries a portion of it away, lubricating the bearing. As the oil is carried away from the wicks, a new supply is continuously drawn from the reservoirs. However, as soon as the journal stops revolving, oil ceases being carried away from the wicks which are then saturated and will not raise more oil from the reservoirs 26. It is obvious that my novel self-oiling bearing is automatic in supplying oil to the bearing and very economical because the oil stops flowing when the journal stops revolving. It will be noted that, because of the contour of the inner wall 9 of the bearing cap 7, the distance through which the oil must be carried by the wicks 27 is reduced to a minimum, thus ensuring a sufficient supply at all times when there is a supply of oil in the reservoirs.

Figure 2:
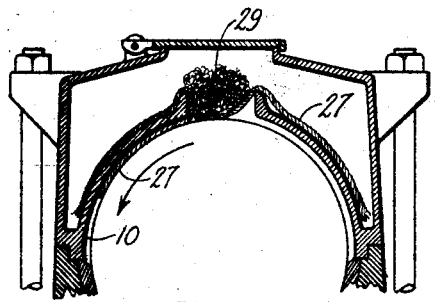
Figure 2 is a transverse cross-section of my self-oiling bearing showing separate wicks from each reservoir lying on the shaft.
Figure 3:
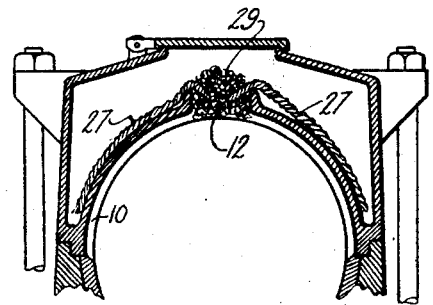
Figure 3 is a transverse cross-section of my self-oiling bearing showing separate wicks which do not touch the bearings.

It is not necessary that wicks 27 be continuous, as shown in the preferred form of my invention, but they may be divided as in Figure 2 when they would lie in the position substantially as shown, when the shaft turns in the direction indicated by the arrow. Figure 3 shows a further modification of my invention wherein the wicks do not touch the journal but simply supply the oil to the waste 29 resting on the journal within the rectangular opening 12.

It will be seen that I have provided a novel and simple self-oiling bearing which is economical, particularly when the journal is run intermittently and which requires very little attention except periodic filling with a supply of oil. My novel bearing will be of great convenience, especially when situated in inaccessible places.

It will further be noted that wicks and waste are easily obtainable in any supply house and, because of the accessible design of my bearing, may be quickly renewed when worn or clogged from long use. It is obvious that the wicks should be as small as possible to carry a sufficient supply of oil since the more space required in the reservoir for the wicks the less space will be allowed for a reserve supply of oil. Furthermore, if the wicks are larger than necessary, more oil is supplied to the bearing than is required, since the cross-sectional area of the wick determines the amount carried.

In my bearing, it is a simple matter to increase the amount of oil delivered to the bearing by inserting more wick members and decrease the supply by removing some of them.

Having thus described my invention, what I claim is—

1. A self-oiling bearing comprising a journal, a bearing base, a bearing cap, oil reservoirs in said bearing cap, and continuous wick structure extending from the bottom of one oil reservoir to the bottom of the other and depressed between said reservoirs to touch the journal.

2. A self-oiling bearing comprising a journal, a bearing base, a bearing cap, oil reservoirs in said bearing cap, and capillary structures extending from the bottom of one reservoir to the bottom of the other and depressed between said reservoirs to touch said journal.

3. A self-oiling bearing comprising a journal, a bearing base, a bearing cap, oil reservoirs in said bearing cap, and a plurality of continuous wick members extending from the bottom of one oil reservoir to the bottom of the other and depressed between said reservoirs to touch said journal and held in coactive relation therewith by absorbent material.

4. A self-oiling bearing comprising a journal, a bearing base, a bearing cap, oil reservoirs in said bearing cap, and a plurality of continuous wick members extending from the bottom of one oil reservoir to the bottom of the other and depressed between said reservoirs to touch said journal and being protected from foreign matter by absorbent material.

5. A self-oiling bearing comprising a journal, a bearing base, a bearing cap, cover for said cap, oil reservoirs in said bearing cap, and a plurality of continuous wick members extending from the bottom of one oil reservoir to the bottom of the other and depressed between said reservoirs to touch said journal and held in coactive relation therewith and being protected from foreign matter by absorbent material.

6. A self-oiling bearing comprising a journal, a lined bearing base, a longitudnal edge of said lining being beveled, a bearing cap, cover for said cap, oil reservoirs in said bearing cap, and a plurality of continuous wick members extending from the bottom of one oil reservoir to the bottom of the other and depressed between said reservoirs to touch said journal and held in coactive relation therewith and being protected from foreign matter by absorbent material.

7. A self-oiling bearing comprising a journal, a bearing base, a bearing cap, oil reservoirs, and continuous wick structure extending from the bottom of one oil reservoir to the bottom of the other and depressed between said reservoirs to touch the journal.

8. A self-oiling bearing comprising a journal, oil reservoirs and capillary structures extending from the bottom of said reservoirs and depressed between said reservoirs to ensure positive oiling of said journal.

In testimony whereof I hereby affix my signature.

RICHARD R. BLOSS.